(12) United States Patent
Nayler

(10) Patent No.: US 6,782,058 B1
(45) Date of Patent: Aug. 24, 2004

(54) DEVICE AND METHOD FOR INTERPOLATED SIGNAL RESAMPLING BETWEEN SAMPLING CLOCK CYCLES

(75) Inventor: Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 772 days.

(21) Appl. No.: 09/769,203

(22) Filed: Jan. 24, 2001

(51) Int. Cl.[7] .................. H04L 27/14; H04L 27/16; H04L 27/22
(52) U.S. Cl. .................. 375/324; 375/316; 375/325; 329/346; 329/304
(58) Field of Search .................. 375/316, 324, 375/325, 326, 340; 329/316, 345, 346, 304

(56) References Cited

U.S. PATENT DOCUMENTS

| | | |
|---|---|---|
| 5,073,904 A | 12/1991 | Nakamura et al. |
| 5,222,144 A | 6/1993 | Whikehart |
| 5,513,209 A | 4/1996 | Holm |
| 5,748,126 A | 5/1998 | Ma et al. |
| 5,933,467 A | 8/1999 | Sehier et al. |

FOREIGN PATENT DOCUMENTS

| | | |
|---|---|---|
| EP | 0 632 577 | 1/1995 |
| EP | 0 651 526 | 5/1995 |
| WO | 98/12836 | 3/1998 |

OTHER PUBLICATIONS

Gardner, "Interpolation in Digital Modem—Part I: Fundamentals"; vol. 41, No. 3, Mar. 1, 1993; pp. 501–507.

*Primary Examiner*—Phuong Phu
(74) *Attorney, Agent, or Firm*—Renner, Otto, Boisselle & Sklar, LLP

(57) ABSTRACT

A circuit for demodulating a modulated carrier includes a sampler receiving the modulated carrier signal and generating a digital carrier signal represented by a sequence of sample values in accordance with a clock signal at a first sampling frequency. A complex mixer frequency shifts the digital carrier signal by a frequency equal to one fourth the sampling frequency to generate a frequency shifted data signal with a sampling rate at the first sampling frequency. A decimation circuit generates four decimated signals from the frequency shifted signal, each at a decimated sampling rate. A resampling circuit generates a data signal at the decimated sampling rate and at a phase independent of the clock signal.

20 Claims, 4 Drawing Sheets

DEVICE AND METHOD FOR INTERPOLATED SIGNAL RESAMPLING BETWEEN SAMPLING CLOCK CYCLES

TECHNICAL FIELD

The present invention relates generally to network interfacing, and more particularly, to a device and method for interpolating signal samples at a resampled clock phase from sample values at related clock phases.

BACKGROUND OF THE INVENTION

The transmission of various types of digital data between computers continues to grow in importance. The predominant method of transmitting such digital data includes coding the digital data into a low frequency baseband data signal and modulating the baseband data signal onto a high frequency carrier signal. The high frequency carrier signal is then transmitted across a network cable medium, via RF signal, modulated illumination, or other transmission medium, to a remote computing station.

At the remote computing station, the high frequency carrier signal must be received and demodulated to recover the original baseband data signal. In the absence of any distortion or reflection of the carrier signal across the network medium, the received carrier would be identical in phase, amplitude, and frequency to the transmitted carrier and could be demodulated using known mixing techniques to recover the base data signal. The baseband data signal could then be recovered into digital data using known sampling algorithms.

However, the network topology tends to distort the high frequency carrier. In the case of a network cable transmission medium, numerous branch connections and different lengths of such branches causing numerous reflections of the transmitted carrier. The high frequency carrier is further distorted by spurious noise caused by electrical devices operating in close proximity to the cable medium. Such problems are even more apparent in a network which uses home telephone wiring cables as the network cable medium because the numerous branches and connections are typically designed for transmission of plain old telephone system POTS signals in the 0.3–3.4 kilohertz frequency and are not designed for transmission of high frequency carrier signals on the order of 7 Megahertz. Further yet, the high frequency carrier signal is further distorted by turn-on transients due to on-hook and off-hook noise pulses of the POTS utilizing the network cables.

Such distortion of frequency, amplitude, and phase of the high frequency carrier signal degrades network performance and tends to impede the design of higher data rate networks. Known techniques for compensating for such distortion and improving the data rate of a network include complex modulation schemes and frequency diversity.

Utilizing a complex modulation scheme such as quadrature amplitude modulation (QAM), both the amplitude and phase of the high frequency carrier are modulated to represent I and Q components of a baseband signal. Referring to FIG. 1, a 4-QAM modulation constellation 10 is shown. In operation, each data symbol is represented by an I-value of +1 or −1 and a Q-value of +1 or −1 such that the data symbol can be represented by one of the four states 12(a)–12(d) in constellation 10. Each constellation point 12(a)–12(d) represents a unique combination of carrier amplitude and phase. For example, constellation point 12(a) represents a carrier amplitude of 14 and a carrier phase 16.

FIG. 2 illustrates the utilization of frequency diversity by transmitting the same data in three mutually exclusive sub-spectra 18(a)–18(c) of the transmission band 20. Therefore, if a portion of the band is distorted (e.g. one or more of the sub-spectra 18(a)–18(c)), the data may still be recovered at the receiver from a less distorted portion of the sub-spectra 18(a)–18(c). For example, a data signal modulated onto a 7 MHz carrier utilizing 6 MHz of bandwidth may include three mutually exclusive sub-bands 18(a)–18(c) centered at 5 MHz, 7 MHz and 9 MHz.

One approach to demodulating and recovering data from such complex signals includes receiver circuits implemented by digital signal processing (DSP).

In accordance with DSP technology, a digital carrier signal is generated by sampling the carrier signal with an A/D converter which is clocked at several times the carrier frequency. Assuming a carrier frequency on the order of 7 MHz, the sampling frequency will be a minimum of 14 MHz in accordance with Nyquist theorem and typically will be on the order of 28 to 32 MHz. A problem associated with processing digital samples at such rates to demodulate a complex modulated carrier, and to process mutually exclusive sub-bands of a frequency diverse system, is that very large and costly digital signal processing systems would be required.

A known solution to reduce the hardware size and complexity is to use decimation filters to reduce the sampling rate after demodulation such that the equalizer filter circuits can be simplified. A problem associated with decimation filters is that they ignore, or decimate, all samples except those in a retained phase which can significantly degrade the quality of the signal represented by the retained samples. Further, when the retained phase is not a phase that closely matches the phase of the transmitted signal, the decimated signal quality is reduced. Therefore, what is needed is a receiver circuit which provides a low frequency sample signal which does not suffer the signal degradation disadvantages associated with known systems.

SUMMARY OF THE INVENTION

A first aspect of the present invention is to provide a receiver circuit for recovering data from a modulated carrier signal. The receiver circuit comprises a sampler, such as an A/D converter, receiving the modulated carrier signal and generating a digital carrier signal. The digital carrier signal is represented by a sequence of sample values in accordance with a first sampling frequency clock signal. A first complex mixer frequency shifts the digital carrier signal by a frequency equal to one fourth the first sampling frequency to generate a frequency shifted data signal. The frequency shifted data signal is also a sequence of sample values with a sampling rate at the first sampling frequency. A resampling circuit receives the frequency shifted data signal and generates a resampled signal. The resampled signal comprises a sequence of resample values at a sampling rate less than the first sampling frequency and at a phase independent of the phase of the clock signal.

Each resample value may be calculated, utilizing an interpolation function, as a function of the phase of the resampled signal and sample values comprising the frequency shifted data signal which are closest in phase to the phase of the resampled signal.

A decimation circuit may receive the frequency shifted data signal and generate four decimated signals, each at one of the four phases of the frequency shifted data signal that are closest in phase to the phase of the resampled signal. The resampler then receives the four decimated data signals. Further, a second complex mixer may frequency shift the decimated data signals by a frequency equal to one half of a sampling rate of the decimated signals.

Further yet, a slicer may receive the resampled data signal and map the resampled data signal to defined constellation coordinates to recover transmitted data. The slicer may also generate an error signal representing the difference between the resampled data signal and the defined constellation coordinates.

In the preferred embodiment, the carrier frequency is 7 MHz, the first sampling frequency is 32 MHz, the sampling rate of the decimated signals are 2 MHz, the first complex mixer frequency shifts the digital carrier by 8 Mhz, the sampling rate of each of the decimated signals is 2 MHz, and the second complex mixer frequency shifts the four decimated signals by 1 Mhz.

A second aspect of the present invention is to provide a receiver circuit for recovering data from a modulated carrier signal. The receiver circuit comprises a decimate circuit receiving a data signal at a first sampling rate and receiving a phase signal from a phase selection circuit. The decimation circuit separates the data signal into a plurality of decimated signals each at a unique decimation phase. A resampler receives the plurality of decimated signals and the phase signal and generates a resampled data signal at a resampling phase in accordance with the phase signal. The resampling phase is independent of the phases of the plurality of decimated signals and the resampled data signal is interpolated from at least two of the decimated signals.

The phase selection circuit may provide for at least two of the decimated signals to be those closest in phase to the phase of the resampling phase. In the preferred embodiment, decimation circuit separates the data signal into four decimated signals and the four decimated signals are the four at phases closest to the resampling phase. The resampled data signal is interpolated form the four decimated data signals. Again, the carrier frequency is 7 MHz, the first sampling rate is 32 MHz, the sampling rate of the decimated signals and the resampled data signal are 2 MHz.

A slicer may receive the resampled data signal and map the resampled data signal to defined constellation coordinates to recover transmitted data. The slicer may also generate an error signal representing the difference between the resampled data signal and the defined constellation coordinates. The selection circuit may receive the error signal and calculate a new resampling phase as a function of the existing resampling phase and the error signal. Further, the phase signal may represent an integer phase signal which is provided to the decimation circuit for selecting the four decimation phases closest to the resampling phase and a fractional phase signal which is provided to the resampler for interpolating the resampled data signal from the four decimated data signals.

A third aspect of the present invention is to provide a method of recovering data from a modulated carrier signal. The method comprises: a) sampling the modulated carrier signal in accordance with a clock signal at a first sampling frequency to generate a digital carrier signal; b) frequency shifting the digital carrier signal by a frequency equal to one fourth the first sampling frequency to generate a frequency shifted data signal with a sample frequency equal to the first sampling frequency; and c) generating, from the frequency shifted data signal, a resampled signal comprising a sequence of resample values at a sampling rate less than the first sampling frequency and at a phase independent of the phase of the clock signal.

Each resample value in the resampled signal may be calculated, or interpolated, as a function of the phase of the resampled signal and sample values comprising the frequency shifted data signal which are closest in phase to the phase of the resampled signal.

The method may further include generating four decimated signals from the frequency shifted data signal, each at one of the four phases of the frequency shifted data signal that are closest in phase to the phase of the resampled signal. The resampled signal would then be calculated from the four decimated signals. The four decimated signals may be frequency shifted by a frequency equal to one half of a sampling rate of the decimated signals. Again, in the preferred embodiment, the carrier frequency is 7 MHz, the first sampling frequency is 32 MHz, the sampling rate of the decimated signals are 2 MHz, the frequency shift of the digital carrier signal is by 8 Mhz, the sampling rate of the decimated signals are 2 MHz, and the frequency shift of the four decimated signals is by 1 Mhz.

DESCRIPTION OF THE PREFERRED EMBODIMENTS

Figure 1:
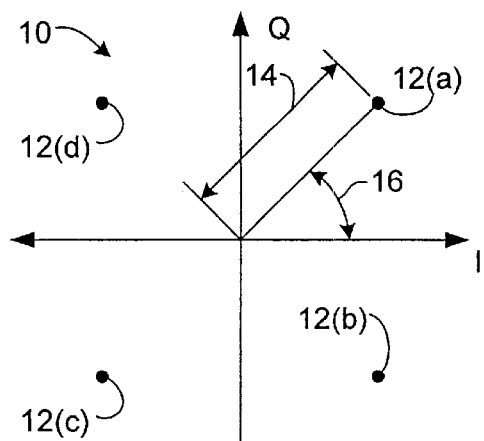
FIG. 1 is a diagram of a complex modulation constellation useful in the practice of the present invention.

The present invention will now be described in detail with reference to the drawings. In the drawings, like reference numerals are used to refer to like elements throughout.

Figure 3:
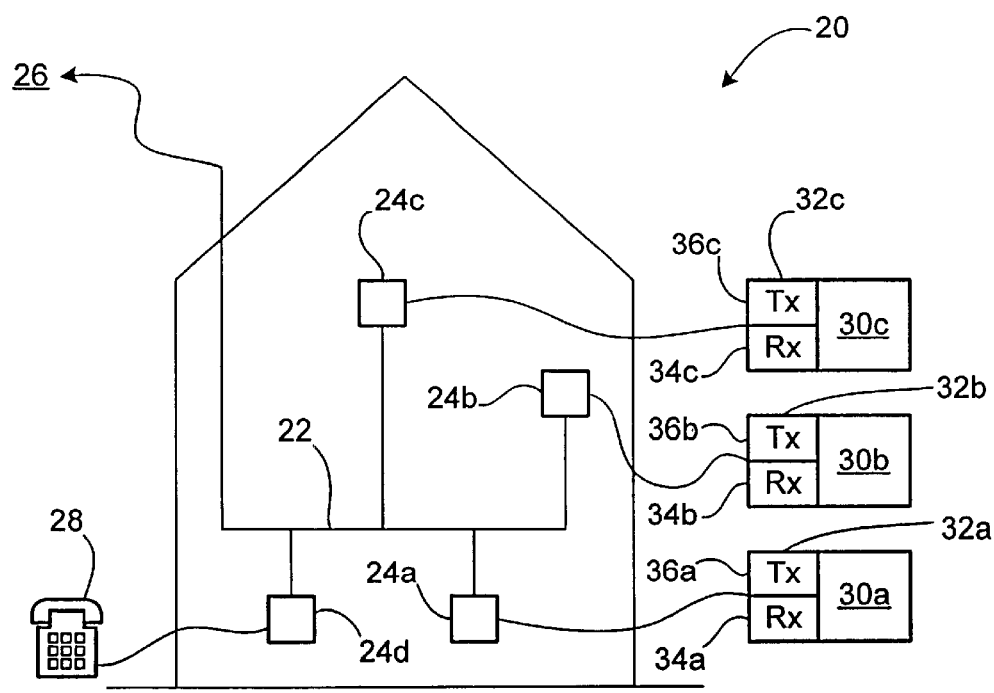
FIG. 3 is a block diagram of a network in accordance with one embodiment of this invention.

Referring to FIG. 3, a network 20 includes a network backbone 22, which interconnects a plurality of data ports 24(a)–24(d). In the preferred embodiment, the network backbone 22 comprises the plain old telephone service (POTS) wiring existing in a household environment and which is coupled to a local telephone service switch 26. The data ports 24(a)–24(d) may comprise the RJ-11 phone jacks positioned at the termination of each branch of the POTS wiring. As such, a POTS telephone 28 can be coupled to one of the data ports 24(d) for normal telephone conversation via the telephone service switch 26 in the 0.3–3.4 KHz frequency band simultaneously with network data traffic in a frequency band on the order of 7 MHz.

A plurality of network devices 30(a)–30(c) are each coupled to one of the data ports 24(a)–24(c) respectively and communicate with other network devices 30(a)–30(c) via the network 20. A predefined data communication protocol such as the HPNA 1.0 and/or 2.0 protocols as promulgated by the Home Telephone Networking Association (HPNA) may be utilized. HPNA comprises a consortium of companies including Advanced Micro Devices of Sunnyvale California.

Each network device 30(a)–30(c) may comprise a typical desktop computer and/or server, printer, or other consumer network device or appliance and is coupled to the network 20 utilizing a network interface circuit 32(a)–32(c). In a network device 30 such as a computer or server, the network interface circuit 32 may be embodied in a network interface card plugged into one of the computer's expansion slots or PCMCIA ports. However, in other consumer appliances or devices, the network interface circuit may be embedded with other circuits for operating such appliance or device.

Each network interface circuit 32(a)–32(c) will typically include a network transmitter circuit 36(a)–36(c) for broadcasting frames on the network backbone 22 and a network receiver circuit 34(*a*)–34(*c*) for detecting and receiving frames from the network backbone 22.

Figure 4A:
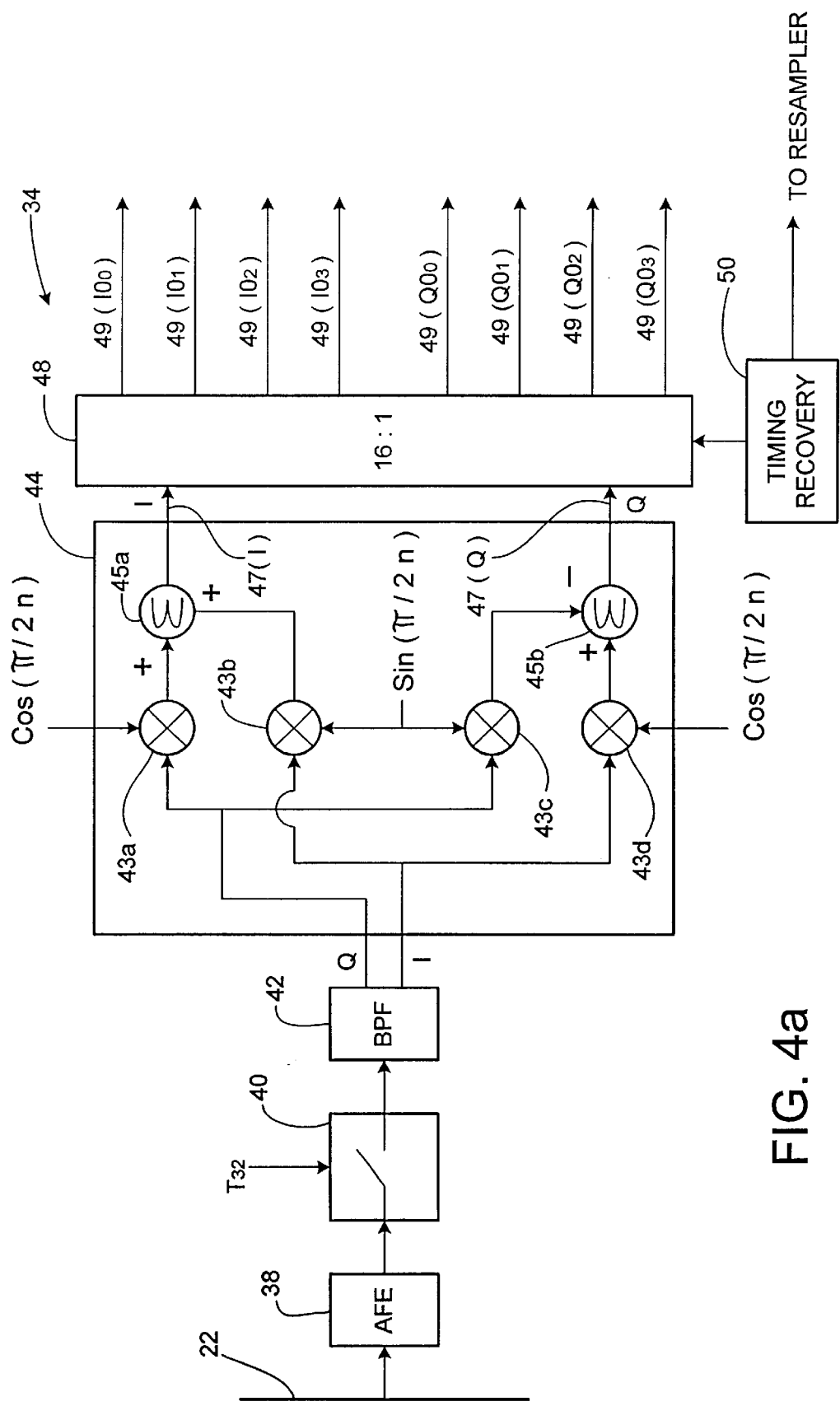
FIG. 4a represents a first portion of a block diagram of a receiver circuit in accordance with one embodiment of this invention.
Figure 4B:
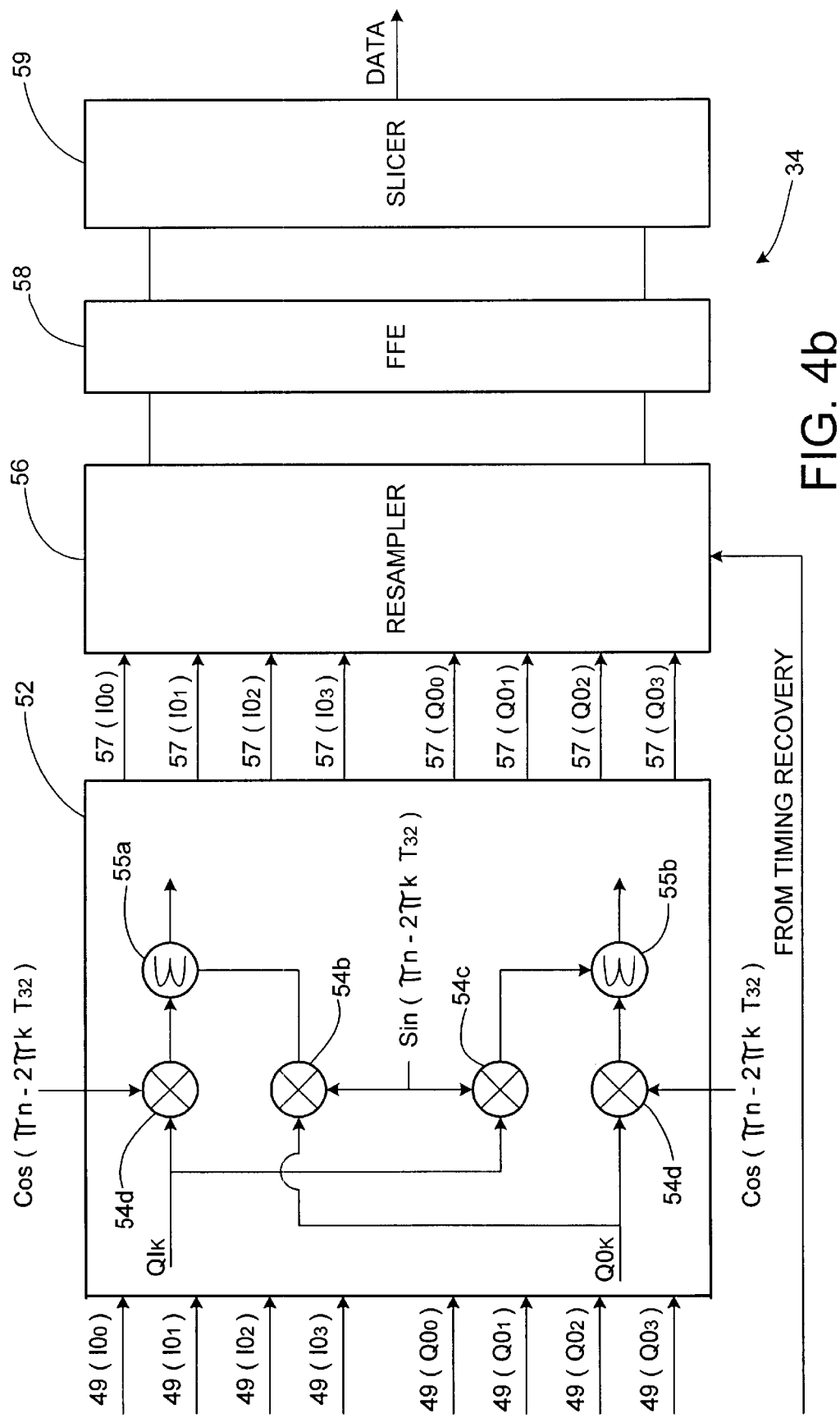
FIG. 4b represents a second portion of a block diagram of a receiver circuit in accordance with one embodiment of this invention.

Referring to FIGS. 4*a* and 4*b*, a block diagram of a receiver circuit 34 in accordance with this invention is shown. Receiver circuit 34 includes an analog front end 38, which includes known analog circuits tuned to the modulated carrier frequency band for receiving a carrier signal from the network backbone 22 and amplifying the carrier signal to utilize the full dynamic range of an A/D converter 40. In the preferred embodiment, the A/D converter 40 is a 10-bit A/D converter driven by a 32 MHz clock signal $T_{32}$.

Figure 2:
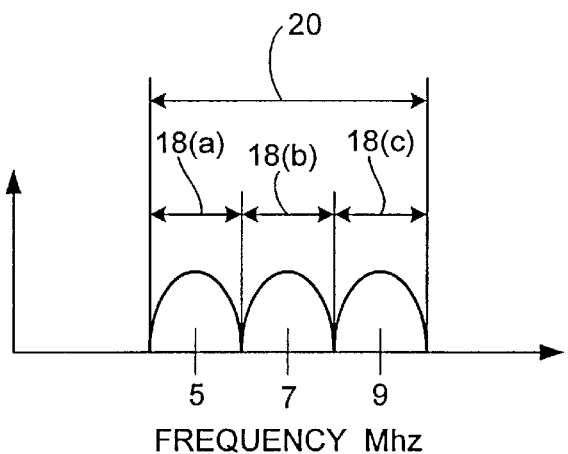
FIG. 2 is a frequency domain diagram of a frequency diverse signal useful in the practice of the present invention.

The output of the A/D converter 40 is a digital carrier signal comprising a sequence of 10-bit sample values clocked at a 32 MHz sampling frequency. The digital carrier signal is coupled to a band pass filter 42 with a pass frequency band centered at the carrier frequency and wide enough to pass the three sub-spectrums 18(*a*)–18(*c*) (FIG. 2). The band pass filter 42 is a complex band pass filter outputting both an I-channel digital carrier signal and a Q-channel digital carrier signal to a complex mixer 44.

The complex mixer 44 includes typical "butterfly" structure and operates to frequency shift both the I-channel digital carrier signal and the Q-channel digital carrier signal by 8 Mhz. The I-channel digital carrier signal is input to mixers 43(*a*) and 43(*c*) wherein it is mixed with an 8 Mhz cosine waveform (e.g. COS($\pi$n/2) wherein n is the sampling number) and an 8 Mhz sine waveform (e.g. SIN($\pi$n/2)) respectively. Similarly, the Q-channel digital carrier signal is input to mixers 43(*b*) and 43(*d*) where it is mixed with an 8 Mhz sine waveform and an 8 Mhz cosine waveform respectively. The outputs of mixers 43(*a*) and 43(*b*) are added in adder 45(*a*) to generate an I-channel output on line 47(I). The output of mixer 43(*c*) is subtracted from the output of mixer 43(*d*) by adder 45(*b*) to generate a Q-channel output on line 47(Q).

It should be appreciated that the selection of an 8 MHz frequency shift significantly simplifies the structure of mixers 43(*a*)–43(*d*). An 8 MHz sine waveform when digitally represented at a 32 MHz sampling frequency is a repetitive sequence of [0,1,0,–1]. Similarly, an 8 MHz cosine waveform when digitally represented by a 32 MHz sampling frequency is a repetitive sequence of [1,0,–1,0]. As such, each of mixers 43(*a*)–43(*d*) need only be capable of multiplying by 1, 0, and –1 which significantly reduces mixer complexity, gate count, and cost.

It should also be appreciated that the 8 MHz frequency shift of the 7 Mhz digital carrier signal by the complex mixer 44 does not generate a base band signal. As such, the I-channel output on line 47(I) and the Q-channel output on line 47(Q) will need to be mixed up by 1 MHz to generate base band.

The I-channel output and the Q-channel output are coupled to a 16:1 decimation filter 48. The purpose of the decimation filter 48 is to reduce the sampling frequency and fold the three mutually exclusive sub-spectrums 18(*a*)–18(*c*) (FIG. 2). It should be appreciated that a sampling frequency that matches the frequency difference between the centers of the three sub-spectrums 18(*a*)–18(*c*) will result in the folding of the frequency diverse signals together. Therefore, wherein the centers of the three sub-spectrums 18(*a*), 18(*b*), and 18(*c*) respectively are at 5 MHz, 7 MHz, and 9 MHz respectively (–3 MHz, –1 MHz, and 1 MHz after the 8 MHz frequency shift), a sampling frequency of 2 MHz will achieve the desired folding. A 16:1 decimation of a 32 MHz sampling frequency will achieve the desired 2 MHz sampling frequency.

The decimation filter 48 generates four retained I-channel signals on lines 49(I$\theta_0$)–49(I$\theta_3$) and four corresponding retained Q-channel signals on lines 49(Q$\theta_0$)–49(Q$\theta_3$). There exists a total of 16 phases at which a 32 MHz sampling frequency signal may be decimated to a 2 MHz sampling frequency signal. The four retained phases $\theta_0$–$\theta_3$ each represent one of four phases which are retained out of the possible 16 phases. The other 12 phases are decimated. More specifically, each of the four retained I-channel signals is a 2 MHz sampling frequency signal, each representing one of the 16 possible phases. Similarly, each of the four retained Q-channel signals is a 2 MHz sampling frequency signal, each representing the same phase as the corresponding retained I-channel signal. A signal from a timing recovery circuit 50 indicates which four of the 16 possible phases are closest to the optimal phase and as such are selected for retention.

The four retained phase groups from the decimation filter 48 are input to a second complex mixer 52 on lines 49(I$\theta_0$)–49(I$\theta_3$) and lines 49(Q$\theta_0$)–49(Q$\theta_3$). As previously discussed, the complex mixer 44 mixes a 7 MHz carrier down by 8 MHz. Therefore, to recover the baseband data signal, the signal must be mixed up by 1 MHz.

The second complex mixer 52 also includes a butterfly structure similar to the complex mixer 44, however, unlike mixer 44 which mixes a single input signal (one I-channel signal and a corresponding Q-channel signal), complex mixer 52 must independently mix four phases of input signals (each phase comprising one I-channel signal and a corresponding Q-channel signal of the same phase). Conceptually, four independent mixer structures exist, each for mixing one of the four phases of input signals and generating one I-channel output signal and one Q-channel output signal, both of the same phase as the input signals. However, because each input signal is at a different phase, a single mixer structure may be used so long as it operates quickly enough to mix each of the four phases independently.

The I-channel signal from one of the lines 49(I$\theta_0$)–49(I$\theta_3$) is input to mixers 54(*a*) and 54(*c*) wherein it is mixed with COS($\pi$n-2$\pi$k$T_{32}$) and with SIN($\pi$n-2$\pi$k$T_{32}$) respectively. Similarly, the same phase Q-channel signal on the corresponding line 49(Q$\theta_0$)–49(Q$\theta_3$) is input to mixers 54(*b*) and 54(*d*) where it is mixed with SIN($\pi$n-2$\pi$k$T_{32}$) and with COS($\pi$n-2$\pi$k$T_{32}$) respectively. The outputs of mixers 54(*a*) and 54(*b*) are added in adder 55(*a*) to generate an I-channel output on line 57(I$\theta_0$)–57(I$\theta_3$). The output of mixer 54(*c*) is subtracted from the output of mixer 54(*d*) by adder 55(*b*) to generate a Q-channel output on line 57(Q$\theta_0$)–57(Q$\theta_3$).

The value of k is an integer value of 0, 1, 2, and 3 representing the phase difference between the first retained phase and the input retained phase. As such, for each K value, a digital representation of each sine waveform and cosine waveform at a 2 MHz sampling frequency is a repetitive sequence of values according to the following table:

| K | Sine Repetitive Sequence | Cosine Repetitive Sequence |
|---|---|---|
| 0 | [0] | [1,–1] |
| 1 | [0.1951,–0.1951] | [0.9808,–0.9808] |
| 2 | [0.3827,–0.3827] | [0.9239,–0.9239] |
| 3 | [0.5556,–0.5556] | [0.8315,–0.8315] |

Figure 5:
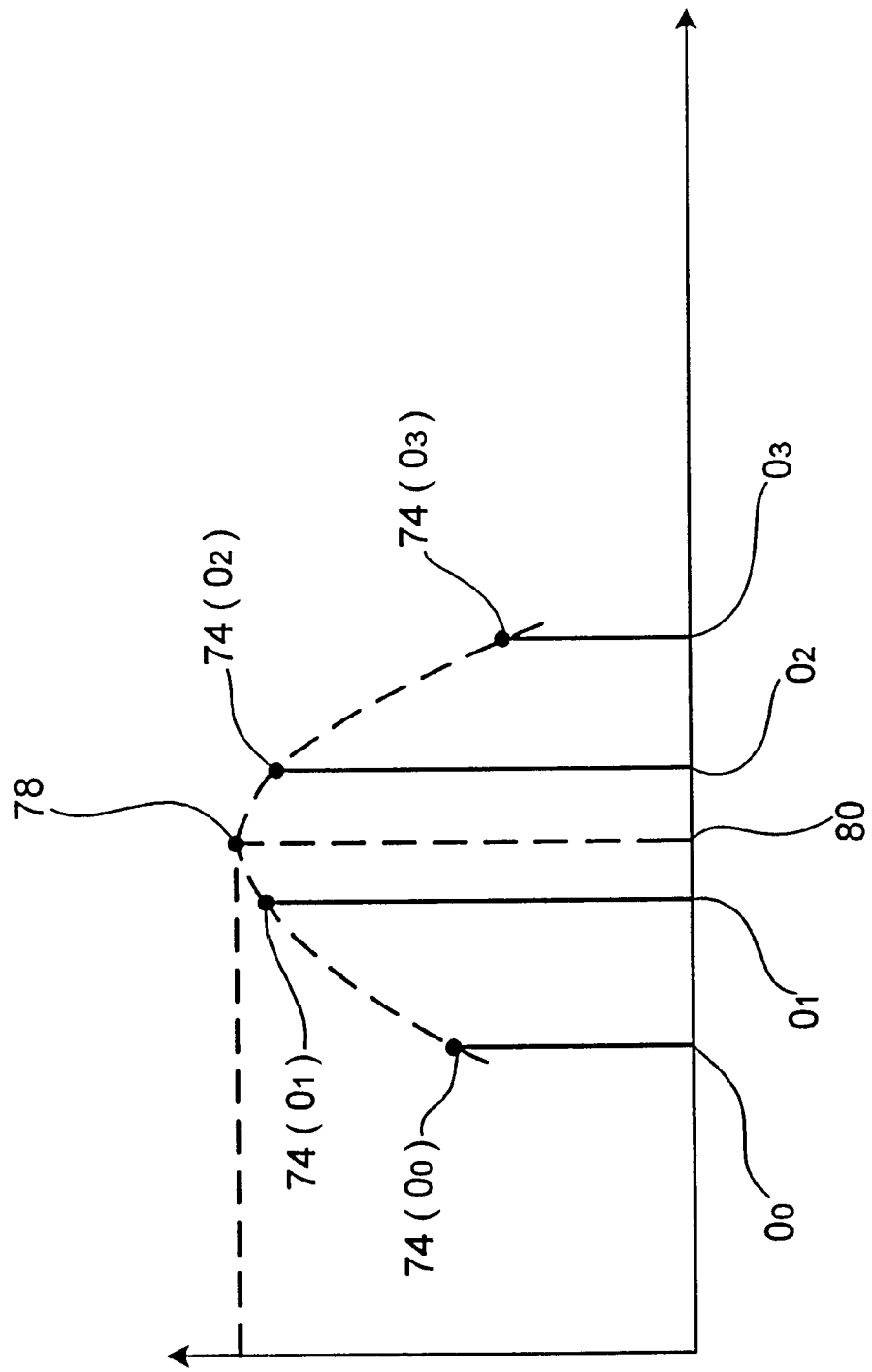
FIG. 5 is a timing diagram representing operation of a resampling circuit in accordance with one embodiment of this invention.

The four retained phases are therefore baseband data signal when output on lines 57(I$\theta_0$)–57(I$\theta_3$) and 57(Q$\theta_0$)–57(Q$\theta_3$). The four phases of baseband data signals (both I and Q) are input to a resampler 56. Referring to FIG. 5 in conjunction with FIG. 4, the resampler 56 utilizes a data sample 74(a$\theta_0$)–74($\theta_3$) from each of the four retained phases $\theta_0$–$\theta_3$ respectively to interpolate a sample value 78 at a phase 80. Phase 80 is a phase which is selected by the timing recovery circuit 50 as a phase which corresponds to the clock phase of the transmitter and may be in-between any of the four retained phases $\theta_0$–$\theta_3$. More specifically, phase 80 is between two of the four retained phases $\theta_0$–$\theta_3$ such that the signal from the timing recovery circuit 50 to the resampler 56 is a fractional value indicating the exact phase of phase 80 with respect to at least one retained phase. Known linear or polynomial interpolation methods may be used to calculate the sample value 78. Such a calculation is performed for both the I-channel and Q-channel.

The output of the resampler 56 is a baseband data signal (both I-channel and Q-channel) comprising a sequence of sample values 78 which approximates the baseband data signal that would have been recovered had the A/D converter 40 sampled at phase 80.

A feed forwarded equalizer 58 receives the output of the resampler 56 and utilized known techniques for reshaping the signal to generate an equalized signal which is input to a slicer 59. The slicer 59 maps each received data sample (both I-channel and Q-channel) to a predefined constellation coordinate to recover the originally transmitted data.

The above described systems and methods provide for a DSP implementation of a receiver and the reduction of a high frequency sampling rate to a significantly lower sampling rate. The systems and methods provide for the reduced sampling rate signal to be of a higher quality than known systems and to provide for demodulating a frequency diverse modulated data signal with reduction in hardware complexity and size over known systems. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A receiver circuit for recovering data from a modulated carrier signal, the receiver circuit comprising:
    a) a sampler receiving the modulated carrier signal and generating a digital carrier signal represented by a sequence of sample values in accordance with a first sampling frequency clock signal;
    b) a first complex mixer and circuit frequency shifting the digital carrier signal by a frequency equal to one fourth the first sampling frequency to generate a frequency shifted data signal with a sampling rate at the sampling frequency, and generating multiple phases of the frequency shifted data signal; and
    c) a resampling circuit receiving the multiple phases of the frequency shifted data signal and generating a resampled signal comprising a sequence of resample values at a sampling rate less than the first sampling frequency and at a phase independent of the phase of the clock signal based on the multiple phases of the frequency shifted data signal.

2. A receiver circuit for recovering data from a modulated carrier signal, the receiver circuit comprising:
    a) a sampler receiving the modulated carrier signal and generating a digital carrier signal represented by a sequence of sample values in accordance with a first sampling frequency clock signal;
    b) a first complex mixer frequency shifting the digital carrier signal by a frequency equal to one fourth the first sampling frequency to generate a frequency shifted data signal with a sampling rate at the sampling frequency; and
    c) a resampling circuit receiving the frequency shifted data signal and generating a resampled signal comprising a sequence of resample values at a sampling rate less than the first sampling frequency and at a phase independent of the phase of the clock signal,
    wherein each resample value is calculated as a function of the phase of the resampled signal and sample values comprising the frequency shifted data signal which are closest in phase to the phase of the resampled signal.

3. The receiver circuit of claim 2, wherein the calculation is an interpolation calculation.

4. The receiver circuit of claim 3, further including a decimation circuit receiving the frequency shifted data signal and generating four decimated signals, each at one of the four phases of the frequency shifted data signal that are closest in phase to the phase of the resampled signal, and wherein the resampler receives the four decimated signals.

5. The receiver circuit of claim 4, further including a second complex mixer frequency shifting the decimated signals by a frequency equal to one half of a sampling rate of the decimated signals.

6. The receiver circuit of claim 5, wherein the carrier frequency is 7 MHz, the first sampling frequency is 32 MHz, the sampling rate of the decimated signals are 2 MHz, the first complex mixer frequency shifts the digital carrier by 8 Mhz, the sampling rate of each of the decimated signals is 2 MHz, and the second complex mixer frequency shifts the four decimated signals by 1 Mhz.

7. The receiver circuit of claim 6, further including a slicer receiving the resampled data signal, mapping the resampled data signal to defined constellation coordinates to recover transmitted data, and generating an error signal representing the difference between the resampled data signal and the defined constellation coordinates.

8. A receiver circuit for recovering data from a modulated carrier signal, the receiver circuit comprising:
    a) a decimation circuit receiving a data signal at a first sampling rate and receiving a phase signal from a phase selection circuit and separating the data signal into a plurality of decimated signals each at a unique decimation phase; and
    b) a resampler receiving the plurality of decimated signals and the phase signal and generating a resampled data signal at a resampling phase in accordance with the phase signal, the resampling phase being independent of the phases of the plurality of decimated signals and the resampled data signal being interpolated from at least two of the decimated signals.

9. The receiver circuit of claim 8, wherein the phase selection circuit provides for two decimated signals to be at the two phases closest to the resampling phase.

10. The receiver circuit of claim 9 wherein the decimation circuit separates the data signal into four decimated signals, the four decimated signal being at the four phases closest to the resampling phase and the resampled data signal being interpolated from the four decimated data signals.

11. The receiver circuit of claim 10, wherein the carrier frequency is 7 MHz, the first sampling rate is 32 MHz, the sampling rate of the decimated signals and the resampled data signal are 2 MHz.

12. The receiver circuit of claim 11, further including a slicer receiving the resampled data signal, mapping the resampled data signal to defined constellation coordinates to recover transmitted data, and generating an error signal representing the difference between the resampled data signal and the defined constellation coordinates.

13. The receiver circuit of claim 12, wherein the phase selection circuit receives the error signal and calculates a new resampling phase as a function of the existing resampling phase and the error signal.

14. The receiver circuit of claim 13, where the phase signal represents an integer phase signal which is provided to the decimation circuit for selecting the four decimation phases closest to the resampling phase and a fractional phase signal which is provided to the resampler for interpolating the resampled data signal from the four decimated data signals.

15. A method of recovering data from a modulated carrier signal, the method comprising:
   a) sampling the modulated carrier signal in accordance with a clock signal at a first sampling frequency to generate a digital carrier signal;
   b) frequency shifting the digital carrier signal by a frequency equal to one fourth the first sampling frequency to generate a frequency shifted data signal with a sample frequency equal to the first sampling frequency, and generating multiple phases of the frequency shifted data signal; and
   c) generating, from the multiple phases of the frequency shifted data signal, a resampled signal comprising a sequence of resample values at a sampling rate less than the first sampling frequency and at a phase independent of the phase of the clock signal.

16. A method of recovering data from a modulated carrier signal, the method comprising:
   a) sampling the modulated carrier signal in accordance with a clock signal at a first sampling frequency to generate a digital carrier signal;
   b) frequency shifting the digital carrier signal by a frequency equal to one fourth the first sampling frequency to generate a frequency shifted data signal with a sample frequency equal to the first sampling frequency; and
   c) generating, from the frequency shifted data signal, a resampled signal comprising a sequence of resample values at a sampling rate less than the first sampling frequency and at a phase independent of the phase of the clock signal,
   wherein each resample value in the resampled signal is calculated as a function of the phase of the resampled signal and sample values comprising the frequency shifted data signal which are closest in phase to the phase of the resampled signal.

17. The method of claim 16, wherein the calculation is an interpolation calculation.

18. The method of claim 17, further including generating four decimated signals from the frequency shifted data signal, each at one of the four phases of the frequency shifted data signal that are closest in phase to the phase of the resampled signal, the resampled signal being calculated from the four decimated signals.

19. The method of claim 18, further including frequency shifting the four decimated signals by a frequency equal to one half of a sampling rate of the decimated signals.

20. The method of claim 19, wherein the carrier frequency is 7 MHz, the first sampling frequency is 32 MHz, the sampling rate of the decimated signals are 2 MHz, the frequency shift of the digital carrier signal is by 8 Mhz, the sampling rate of the decimated signals are 2 MHz, and the frequency shift of the four decimated signals is by 1 Mhz.

* * * * *